United States Patent [19]

Uesugi

[11] 4,247,169
[45] Jan. 27, 1981

[54] LENS BARREL CAPABLE OF AXIAL ZOOMING OPERATION AND WITH BARREL WINDOW

[75] Inventor: Kyozo Uesugi, Sakai, Japan

[73] Assignee: Minolta Camera Kabushiki Kaisha, Osaka, Japan

[21] Appl. No.: 90,698

[22] Filed: Nov. 2, 1979

[30] Foreign Application Priority Data

Nov. 4, 1978 [JP] Japan .................... 53/152166

[51] Int. Cl.³ ................ G02B 7/10; G02B 15/16
[52] U.S. Cl. ........................ 350/430; 350/110
[58] Field of Search ............... 350/187, 255, 110

[56] References Cited

FOREIGN PATENT DOCUMENTS 53-32027  3/1978  Japan ........................ 350/187
53-82341  7/1978  Japan ........................ 350/187

Primary Examiner—Jon W. Henry
Attorney, Agent, or Firm—Watson, Cole, Grindle & Watson

[57] ABSTRACT

A zoom lens barrel capable of indicating adjusted distance and focal length is of compact construction having only those members essential for focusing and zooming. No special scale member is provided, although a focal length or zoom ratio scale extends circumferentially along the outer periphery of a cam ring which is rotated upon the zooming operation, while a distance scale extends circumferentially along an operating ring substantially at its rearward end. A stationary barrel on and in which the cam ring and the operating ring, respectively, are fitted has a window for the focal length or zoom ratio scale and an index at an external position adjacent the rearward end of the operating ring. Rotation of the ring causes helicoid threads to axially move a first lens group for focusing and the adjusted distance on the distance scale is indicated by the index. Axial movement of the operating ring axially moves the front lens group as well. This causes a pin-slot engagement to rotate the cam ring so that a second lens group is axially moved for zooming in a given spacial relationship with respect to the first lens group, and the adjusted focal length or zoom ratio on the focal length or zoom ratio scale seen through the window is indicated by the index.

3 Claims, 3 Drawing Figures

LENS BARREL CAPABLE OF AXIAL ZOOMING OPERATION AND WITH BARREL WINDOW

BACKGROUND OF THE INVENTION

This invention relates generally to a zoom lens barrel capable of axial zooming operation, and more particularly to such a zoom lens barrel which includes an operating ring to be rotated and axially moved for focusing and zooming, respectively, and which has incorporated a zoom lens optical system with a first lens group used for both focusing and zooming.

In a zoom lens barrel capable of axial zooming operation, a scale ring is generally provided so that it may only be rotated and moved along the optical axis by the respective rotation and movement of an operating ring along such axis. The end of the scale ring along the optical axis indicates a focal distance scale formed axially on a stationary barrel, and an index formed on the stationary barrel indicates a camera-to-subject distance scale formed circumferentially on the scale ring.

However, such a scale ring is not required for the zooming and focusing operations so that, when provided, it effects an increase in the number of parts, processes, and assembly operations required for the zoom lens barrel. Accordingly, prior art zoom lens barrels of the above-mentioned type are costly to produce and are disadvantageous in that they are relatively large in size and heavy in weight.

SUMMARY OF THE INVENTION

Therefore, the principle object of the invention is to provide a zoom lens barrel capable of axial zooming operation, which obviates the foregoing disadvantages and which permits the indication of a focal length scale and a camera-to-subject distance scale by only using parts functionally required therefor. The zoom lens barrel according to the invention features a focal scale formed circumferentially and integrally with a cam ring which is rotated by the movement of an operating ring along the optical axis to make zooming possible, a window provided on a stationary barrel for observing the focal length scale, a camera-to-subject distance scale provided circumferentially on the operating ring and an index provided on the stationary barrel adjacent the window.

The present zoom lens barrel therefore has no special scale member but is provided with the observation window on the stationary barrel to thereby minimize unnecessary parts for carrying out the focusing and zooming functions. This results in a decrease in the number of parts, processes and assembling operations, whereby production costs are lowered and the zoom lens barrel can be made more compact and lightweight.

Other objects, advantages and novel features of the invention will become more apparent from the following detailed description of the invention when taken in conjunction with the accompanying drawings.

DETAILED DESCRIPTION OF THE INVENTION

Figure 1:
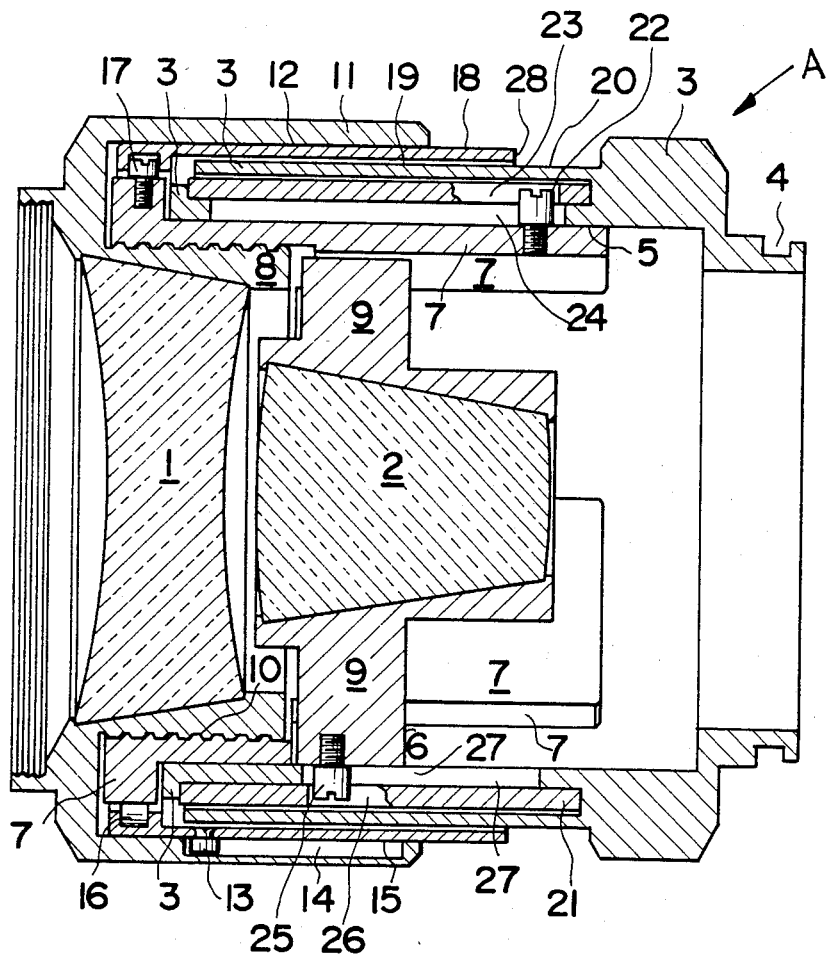
FIG. 1 is a cross-sectional view taken along the optical axis of a conventional zoom lens barrel capable of axial zooming operation.

FIG. 1 shows an example of a conventional zoom lens barrel, generally designated A, capable of axial zooming operation and is compared with a zoom lens barrel of a similar type according to the present invention. A first lens group 1 is shown in FIG. 1 which is used for both zooming and focusing, and a second lens group 2 is used only for zooming. The first lens group is supported by a first lens group frame 8 which has an integral operating ring 11 extending about the outer peripheral wall of a stationary or fixed barrel 3. Rotation of operating ring 11 effects movement thereof along the optical axis together with first lens group 1 by reason of the interengaged helicoid threads 10 formed between frame 8 and a first movable frame 7 whereby focusing is carried out. During such focusing, frame 7 is prevented from rotating by means of a pin 22 extending radially outwardly thereof and into a groove 24 extending in the direction of the optical axis and formed in the stationary or fixed barrel 3. In contrast thereto when operating ring 11 is moved in a straightforward direction along the optical axis together with first lens group 1, first movable frame 7 is correspondingly moved in the same direction via the interconnection through helicoid threads 10, and a cam ring 21 is rotated relative to fixed barrel 3 by means of pin 22 extending into a cam groove 23 provided in the cam ring. The fixed barrel has an inner peripheral wall spaced inwardly from the outer peripheral wall thereof so as to present a circumferential recess opening into the forward end of the fixed barrel. The cam ring, as seen in FIG. 1, is disposed in this recess and extends about the inner peripheral wall. Rotation of cam ring 21 moves a second movable frame 9 (and second lens group 2 supported by this frame) along the optical axis at a predetermined speed under the action of a pin 25 which extends into a cam groove 26 and into an axially extending lead groove 27, whereby zooming is carried out.

A scale ring 15 includes a camera-to-subject distance scale 18 formed circumferentially thereon, and engages operating ring 11 for sliding movement at a surface 12 thereof. A pin 17 extending radially outwardly of the frame 7 engages a circumferential groove 16 provided in scale ring 15 for interconnecting the scale ring with frame 7, and a pin 13 radially extending from the scale ring into a groove 14 extending along the optical axis in operating ring 11 effects interconnection of the scale ring without being moved along the optical axis when operating ring 11 is rotated, and the scale ring is moved in a straightforward direction along the optical axis together with operating ring 11 when moved along the optical axis. A reading of the camera-to-subject distance scale on scale ring 15 is therefore made possible with index 20 on stationary barrel 3, and a focal length or zoom ratio scale formed axially on stationary barrel 3 can also be read by rearward end surface 28 of scale ring 15.

The assembly shown in FIG. 1 also includes a mount 4 provided on the stationary barrel, as well as fitting surfaces 5 and 6 respectively provided on the barrel and on frame 9.

Figure 2:
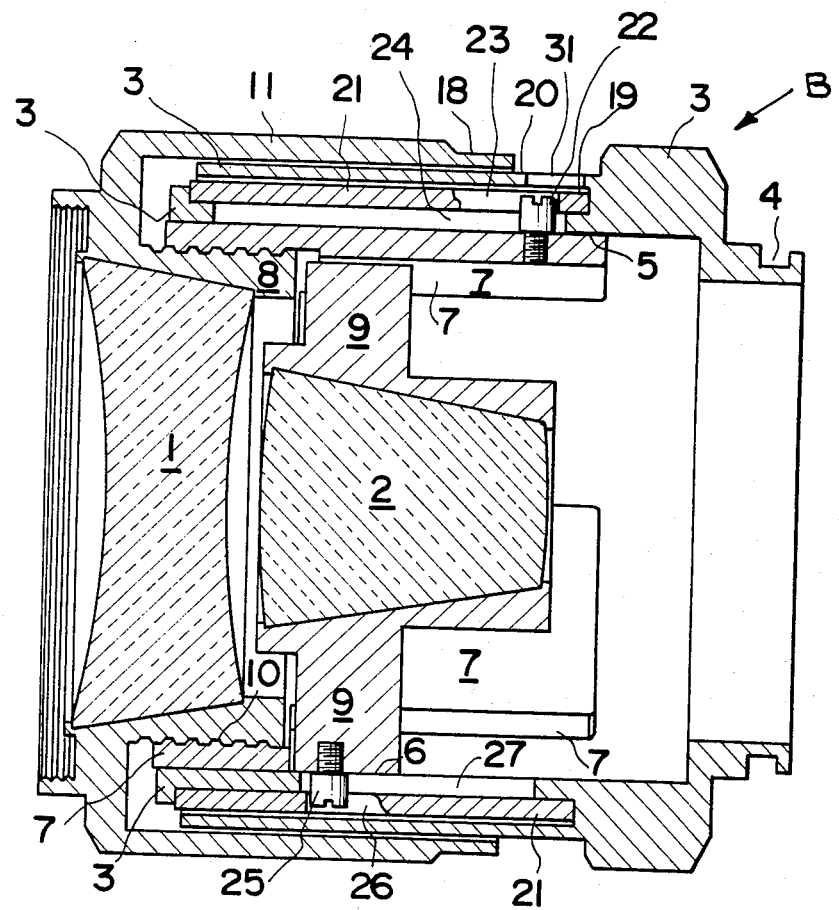
FIG. 2 is a cross-sectional view taken along the optical axis of a zoom lens barrel capable of axial zooming operation according to the present invention.

Referring to FIG. 2, a zoom lens barrel according to the invention is generally designated B, and parts common to zoom lens barrel A and B will bear the same reference numerals. In FIG. 2, camera-to-subject distance scale 18 and focal distance scale 19 are respectively formed circumferentially on the outer surfaces of operating ring 11 and cam ring 21, and an index 20 and a window 31 are formed on fixed barrel 3. Therefore, upon rotation of operating ring 11, relative to stationary barrel 3 at the time of focusing, camera-to-distance scale 18 may be read by means of index 20. On the other hand, focal length or zoom ratio scale 19 can be observed through window 31. And, since cam ring 21 is rotated only for zooming, focal length or zoom ratio scale 19 can be read through window 31 similarly by means of index 20. It should be pointed out that a transparent plate or a magnifying lens may be fitted in window 31. Also, operating ring 11 is so arranged that its rearward end is located forwardly of window 31, so that no opening or window or cutout need be formed in the operating ring to facilitate observation of focal length or zoom ratio scale 19.

When comparing the conventional zoom lens barrel A of FIG. 1 with the zoom lens barrel B of FIG. 2 according to the invention, it can be seen that an additional process step is required for the forming of window 31 although scale ring 15 is omitted thereby dispensing with the need for pins 13 and 17, fitting surface 12, and grooves 14 and 16. Moreover, the overall diameter and axial length of zoom lens barrel B is reduced by the present invention relative to that of zoom lens barrel A.

The following Table compares the increase and decrease in the number of parts and manufacturing processes between zoom lens barrel A and B.

|  | Increase of B over A | Decrease of B from A |
|---|---|---|
| Parts reference numerals |  | 13, 15 & 17 |
| Process reference numerals | 31 | 12, 14 & 16 |

Figure 3:
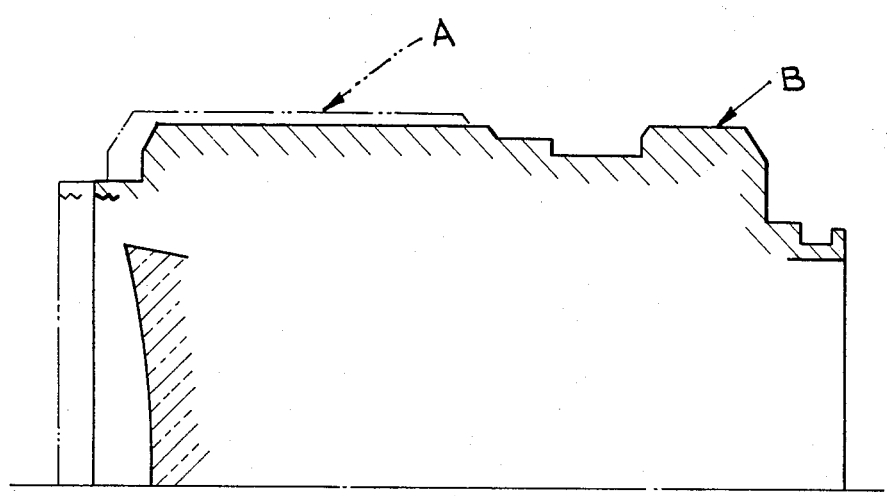
FIG. 3 is a profile illustrating the difference in size between the zoom lens barrels of FIGS. 1 and 2.

The zoom lens barrel according to the present invention is therefore capable of not only being produced at a lower cost as compared to the conventional zoom lens barrel A of FIG. 1, but is also lighter in weight and smaller in size. FIG. 3 illustrates in outline form a comparison between the overall diameter and length of zoom lens barrel B (shown in solid outline) relative to that of zoom lens barrel A (shown in phantom outline). The diameter of zoom lens barrel B is made smaller by eliminating the scale ring, and the length of zoom lens barrel B along the optical axis is made shorter by omitting the large diameter portion of movable frame 7.

The invention has been described in relation to a conventional zoom lens barrel A of FIG. 1 although the invention is not limited to the embodiment in FIG. 2. For example, focal length or ratio scale 19 may be formed on a thin plate to be fixed to cam ring 21 rather than being formed directly on the cam ring. And, when index 20 is not utilized for indicating a focal distance scale, index 20 may be formed on operating ring 11 and the camera-to-subject distance scale may be formed on stationary barrel 3. Moreover, movable frames 7 and 9 may be guided along the optical axis by means of a guide bar, and an optical system of any other known type can be provided rather than that shown in FIG. 2 as, for example, provision of a first lens group used for both focusing and zooming in lieu of the two-component zoom system shown in FIG. 2. Furthermore, the zoom lens barrel of the present invention may be adapted for not only the so-called exchangeable lenses, but may also be prefixed to the camera.

It can be seen that the aforedescribed zoom lens barrel according to the present invention is provided with no special scale member thereby minimizing unnecessary parts for carrying out the focusing and zooming operations. This results in a decrease in the number of parts, processes and assembling operation, whereby production at lower cost is made possible and in addition, the zoom lens barrel can be made more compact and lightweight.

Obviously, many other modifications and variations of the present invention are made possible in the light of the above teachings. It is to be therefore understood that within the scope of the appended claims, the invention may be practiced otherwise than as specifically described.

What is claimed is:

1. A lens barrel for a zoom lens system which includes first and second lens groups and wherein focusing is effected by axial movement of said first lens group whereas zooming is effected by relative axial movement between said first and second lens groups, the lens barrel comprising:
 a stationary barrel having a window and an index lying adjacent said window;
 an operating ring extending about an outer peripheral wall of said stationary barrel and being mounted for axial and rotational movement relative to said barrel, said ring having a rearward end lying forwardly of said window and said index, said first lens group being supported by said ring so as to be axially movable together therewith, and said ring having circumferentially extending distance scale provided on the outer periphery thereof adjacent said rearward end;
 means engaging said operating ring for axially moving said ring upon rotation thereof;
 said stationary barrel having an inner peripheral wall spaced inwardly from said outer peripheral wall, a cam ring being rotatably mounted on said inner wall and having a circumferentially extending focal length or zoom ratio scale provided on the outer periphery thereof, said focal length or zoom ratio scale being disposed beneath said window for viewing therethrough;
 means interconnecting said cam ring with said operating ring for effecting rotation of said cam ring in response to axial movement of said operating ring and for preventing rotation of said cam ring during rotation of said operating ring; and
 means interconnecting said second lens group with said cam ring for axially moving said second lens group in response to rotation of said cam ring.

2. The lens barrel according to claim 1, wherein a transparent plate is disposed in said window.

3. The lens barrel according to claim 1 wherein a magnifying lens is disposed in said window.

* * * * *